(12) United States Patent
Schildermans et al.

(10) Patent No.: US 8,648,862 B2
(45) Date of Patent: Feb. 11, 2014

(54) METHOD FOR AUTOMATICALLY MODIFYING A GRAPHICS FEATURE TO COMPLY WITH A RESOLUTION LIMIT

(75) Inventors: Luc Henri Maria Leon Schildermans, Ghent (BE); Wim Jan C. Fransen, Bornem (BE); Frank Adegeest, VC Hulst (NL)

(73) Assignee: Esko Software BVBA, Ghent (BE)

( * ) Notice: Subject to any disclaimer, the term of this patent is extended or adjusted under 35 U.S.C. 154(b) by 249 days.

(21) Appl. No.: 12/840,899

(22) Filed: Jul. 21, 2010

(65) Prior Publication Data

US 2012/0019552 A1 Jan. 26, 2012

(51) Int. Cl.
*G06K 15/02* (2006.01)

(52) U.S. Cl.
USPC .......... 345/471; 345/472; 345/619; 345/467; 345/469; 345/441; 400/136; 358/3.29; 358/1.2; 101/114; 101/2; 101/3.1

(58) Field of Classification Search
None
See application file for complete search history.

(56) References Cited

U.S. PATENT DOCUMENTS

| | | | |
|---|---|---|---|
| 5,280,576 A | | 1/1994 | Cao |
| 5,459,828 A | * | 10/1995 | Zack et al. ............ 345/472 |
| 5,757,384 A | | 5/1998 | Ikeda et al. |
| 5,872,573 A | | 2/1999 | Adegeest |
| 6,340,981 B1 | * | 1/2002 | Graham et al. ........ 715/863 |
| 7,535,471 B1 | | 5/2009 | Mansfield |
| 2005/0024361 A1 | * | 2/2005 | Ikeda et al. ............ 345/441 |
| 2006/0114258 A1 | | 6/2006 | Stamm et al. |
| 2010/0013835 A1 | * | 1/2010 | Kuhns .................. 345/471 |
| 2010/0053171 A1 | | 3/2010 | Cheng |

FOREIGN PATENT DOCUMENTS

| | | |
|---|---|---|
| EP | 0 654 778 A1 | 5/1995 |
| EP | 2 211 333 A1 | 7/2010 |

OTHER PUBLICATIONS

Bai et al., Skeleton Pruning by Contour Partitioning with Discrete Curve Evolution, IEEE Transactions on Pattern Analysis and Machine Intelligence, pp. 449-462 (Mar. 2007).*
Stamm, Beat, "Object-orientation and extensibility in a font-scaler," *Electronic Publishing*, vol. 6(3), 159-170, Sep. 1993.
European Search Report dated Nov. 4, 2011.
Eppstein, et al., David, "Raising Roof, Crashing Cycles, and Playing Pool: Application of a Data Structure for Finding Pairwise Interaction," Discrete & Computational Geometry, Jul. 1, 1998, 22(4):569-592.
Esko Artwork, Esko PackEdge 10, User Guide, Copyright Jun. 2010.
Zongker, et al., Douglas E., "Example-Based Hinting of True Type Fonts," *Computer Graphics Proceedings, Annual Conference Series*, Jul. 23-28, 2000; pp. 411-416.

* cited by examiner

*Primary Examiner* — Xiao M. Wu
*Assistant Examiner* — Greg Raburn
(74) *Attorney, Agent, or Firm* — RatnerPrestia

(57) ABSTRACT

A method, system and computer readable media relating to automatically adjusting a graphics feature to compensate for a predetermined resolution limit. The method generally relates to automatically identifying, within a selected area of a graphics file, one or more portions of at least one graphics feature meeting predetermined criteria for adjustment, including criteria for defining a thin portion having a thickness less than the resolution limit. The method then automatically modifies only the identified one or more portions to have an adjusted thickness greater than the initial thickness. Additional criteria may be used to restrict which thin portions of the feature are actually modified.

22 Claims, 7 Drawing Sheets

METHOD FOR AUTOMATICALLY MODIFYING A GRAPHICS FEATURE TO COMPLY WITH A RESOLUTION LIMIT

FIELD OF INVENTION

The present invention relates generally to the field of graphical data processing and more specifically to a method and system for modifying a portion of a graphical object, such as but not limited to a text character, for compliance with a resolution limit, such as but not limited to a predetermined or user-defined limit that facilitates improved printing, cutting, or displaying of the graphics feature.

BACKGROUND OF THE INVENTION

Computerized graphic design programs for composing and editing graphic designs are well known in the art. The created designs are typically stored as graphical data files that are ultimately sent to an output device for printing and/or display. In some commercial processes, the output process may include a preprint process followed by the process of printing itself.

Over time, print and display options have advanced to permit graphics with higher and higher resolution. Unfortunately, some portions of high-resolution graphics may be incompatible with lower resolution printers, printing plate makers, or displays, and even if supported by high-resolution output devices, other considerations may dictate using lower resolution limits, such as for example, for better viewability or printability. Similarly, the resolution of cutters used in the graphic arts field has also improved over time, making it possible for cutters to cut objects to very thin specifications, While cutters may be able to cut thin graphical object portions, such thin portions may be fragile and subject to breakage. Accordingly, although cutters may have the technological capability of achieving a high resolution, a user may still want to override that capability by imposing a limit on how thin any part can be cut.

While it has long been known in the art to identify graphics features that do not meet predefined printer or plate-maker resolution limits, such as pursuant to a "preflight" check of a file prior to sending it to an output device, once such features have been identified, users have been on their own to resolve any identified problems. Accordingly, users may have needed to make manual repairs to graphic objects, or in the case of text or other characters, may have chosen a different font with an acceptable resolution for all portions of the entire font set. While choosing a different font may lead to other problems, the user has not had an option to modify only the unacceptable portions of the graphic characters, rather than the entire font set.

Accordingly, there is a need in the art to identify thin portions of graphical objects relative to a defined resolution limit and to automatically convert only the identified portions to thicker portions that meet defined resolution limits.

SUMMARY OF THE INVENTION

One aspect of the invention comprises a method for automatically adjusting a graphics feature, such as but not limited to a text character, including but not limited to a non-Latin character, to compensate for a predetermined resolution limit. The method comprises the steps of (a) automatically identifying, in at least a selected area of an input file, one or more portions of at least one graphics feature meeting predetermined criteria for adjustment, (b) automatically modifying only the identified one or more portions to have an adjusted thickness greater than the initial thickness; and (c) creating an output file comprising the at least one graphics feature having the identified portion having the adjusted thickness. The predetermined criteria for adjustment includes at least criteria for determining that the portion of the graphics feature has an initial thickness less than the predetermined resolution limit. Additional predetermined criteria may include criteria for determining that the one or more portions has a location lying between two portions of the graphic feature each having a thickness greater than a resolution limit; and/or criteria for determining that the one or more portions has a location not corresponding to a skeleton point within a predetermined distance of one or more of: a skeleton initiation end point, a sharp corner, or an unsharp corner. The method may further comprise sending the output file to an output device and using the output device to display, print, make a printing plate comprising, or cut from a material the at least one graphics feature having the identified portion with the adjusted thickness.

In one embodiment, for a graphics feature with an initial outline comprising a plurality of points, step (a) of identifying a "thin portion" for adjustment comprises (i) defining at least a portion of a skeleton for the at least one graphics feature; (ii) calculating a first radial value from the portion of the skeleton to one or more nearest points on the initial outline, and (iii) identifying a subset of nearest points for which the first radial value is less than a second radial value corresponding to half the predetermined resolution limit. In this embodiment, step (b) of automatically modifying comprises (i) defining a modified outline corresponding to the subset in which each nearest point to the skeleton on the modified outline has a distance from the skeleton corresponding to the second radial value. In one embodiment, step (b)(i) of defining the modified outline comprises using a stroke algorithm to define a stroke centered along the skeleton.

In one embodiment, the output file may comprise a plurality of layers, in which the modified outline is stored on a different layer than the initial outline.

Another aspect of the invention comprises a system for automatically adjusting a graphics feature to compensate for a predetermined resolution limit, the system comprising a controller comprising a processor having a memory programmed with the method steps described herein. The system may further comprise a printer, a printing plate maker, or a cutter connected to the controller.

Still another aspect of the invention comprises computer readable media including program instructions which when executed by a processor cause the processor to perform the method steps described herein. The computer readable media may comprise portable memory media, such as a CD, DVD, memory stick, or may comprise computer memory that resides on a computer network, computer server, or individual computer.

BRIEF DESCRIPTION OF THE DRAWINGS

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Figure 1B:
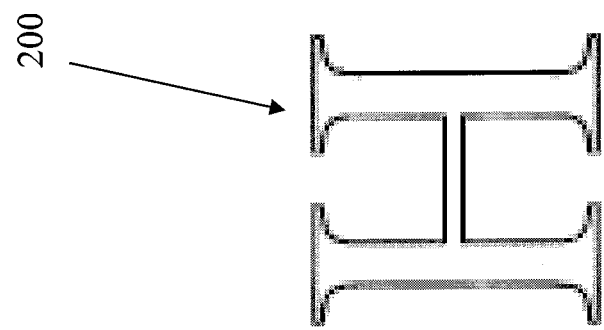
FIG. 1B is an illustration of the outline of the exemplary character H of FIG. 1A.

Although the invention is illustrated and described herein with reference to specific embodiments, the invention is not intended to be limited to the details shown. Rather, various modifications may be made in the details within the scope and range of equivalents of the claims and without departing from the invention.

Throughout the rest of this application, the term "output device" shall mean any device that may be associated with processing a graphical object in a graphics file for its intended use, such as a display for displaying the graphical object, a printer for printing the graphical object, a plate maker for making a printing plate that is later used to print the graphical object, or a cutter for cutting material in a shape corresponding to the graphical object. The present invention will be further described based on embodiments as examples, but the invention is not limited to these examples.

It is well understood in the art that there are any number of ways to express the computerized instructions readable by a computer to generate the output corresponding a graphics file. This invention is not specific to any particular way of expressing the instructions, nor does this disclosure describe in detail how these instructions are formatted, stored or processed by output devices, all of which is well understood by those of skill in the art and well documented in the literature. Regardless of how the various graphical objects are expressed by the corresponding software for generating such objects or in the stored instructions used for instructing the software, it is well understood that each graphical object corresponds to instructions executable by a computer to produce a tangible result, whether that result constitutes a display, a printed page, a printing plate, a cut sheet of material, or any other type of output. Numerous systems already exist for interpreting these computerized instructions into formats used by editors to manipulate the graphical objects expressed by those instructions. This invention is not limited to any particular system for interpreting or editing such instructions. Rather, this invention relates to ways in which existing editors can process the informational data associated with graphical objects to modify portions of those objects in accordance with certain predefined rules.

Specifically, embodiments of the present invention include methods for detecting and fixing thin parts of selected graphical objects. The method for such detection and fixing of graphical objects may be applied to the entire file, or to a portion of the file selected automatically or selected by a user, such as a user highlighting a portion of a display viewable via a user interface. Computerized algorithms for selecting portions of graphics files using a user interface are well known in the art. The graphical objects may be represented by one or more contour paths that define an outline, which may be filled or unfilled. For graphical objects stored in a format that does not include defining the outlines of the objects, a preliminary method step may comprise converting the graphical object to an outline format. Computerized processes for making such conversions are already well known in the art.

A first step in an exemplary embodiment of the present invention comprises reviewing selected graphical objects and evaluating them to determine whether all parts of the objects meet predetermined criteria. The predetermined criteria may include a threshold thickness corresponding to a resolution limit. Anything below the threshold thickness is characterized herein as a "thin" portion. The resolution limit may be a predetermined limit corresponding to the capabilities of the output device or may be a user-defined limit. Additional criteria may be used to identify thin portions that are subject to correction or that should not be corrected. For example, as described herein later, it may be desirable to fix only thin portions that lie between two portions of a graphical object each having a thickness greater than the resolution limit. Additional criteria are discussed herein later in conjunction with specific examples. Regardless of the specific criteria, in general the various embodiments of the invention comprising identifying portions of graphical objects that are too thin and subsequently thickening them to comply with a defined resolution limit.

In one exemplary embodiment of the present invention, the target graphical objects may comprise text characters, such as but not limited to Latin and non-Latin characters, such as Asian or Arabic characters. These text characters may contain many thin parts which can give undesired results on a gravure press. It should be understood, however, that present invention is not limited to text characters, any particular type of text characters, or any particular type of output device or technology, and that embodiments of the invention may be used to detect and modify graphical objects of all types.

In some exemplary embodiments of the present invention, the thin parts of the graphical object are detected using a center line or "skeleton" algorithm. One exemplary such algorithm is the "grassfire" algorithm, which is well known in the art. Various algorithms for creating skeletons are well known and documented in the art, including algorithms for forming "medial axis" skeletons and "straight" skeletons. Although shown and described herein in conjunction with a medial axis skeleton in which each point on the medial axis skeleton has at least two points corresponding to the outline as it nearest neighbor, a straight skeleton may also be derived in which each point of the skeleton has as it nearest neighbors at least two points corresponding to the outline or to line extensions of lines that form reflex corners of the outline. The invention is not limited to any particular thin part detection method, however, nor to any particular algorithm for generating skeletons or any particular type of skeletons corresponding to graphical objects.

Figure 1A:
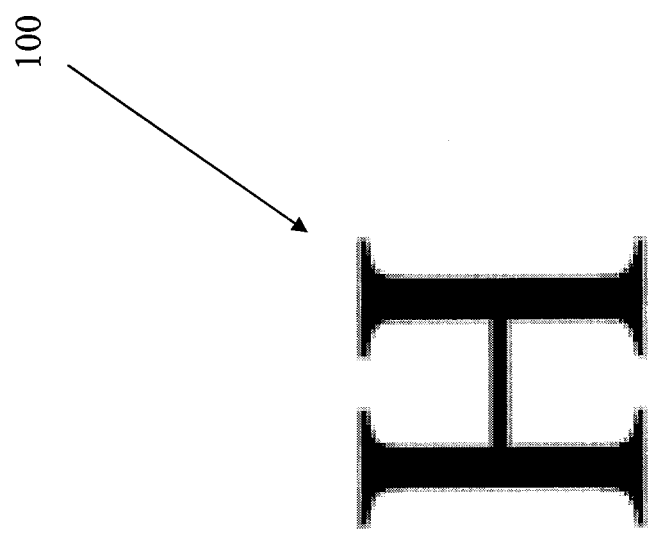
FIG. 1A is an illustration of an exemplary character H.
Figure 2C:
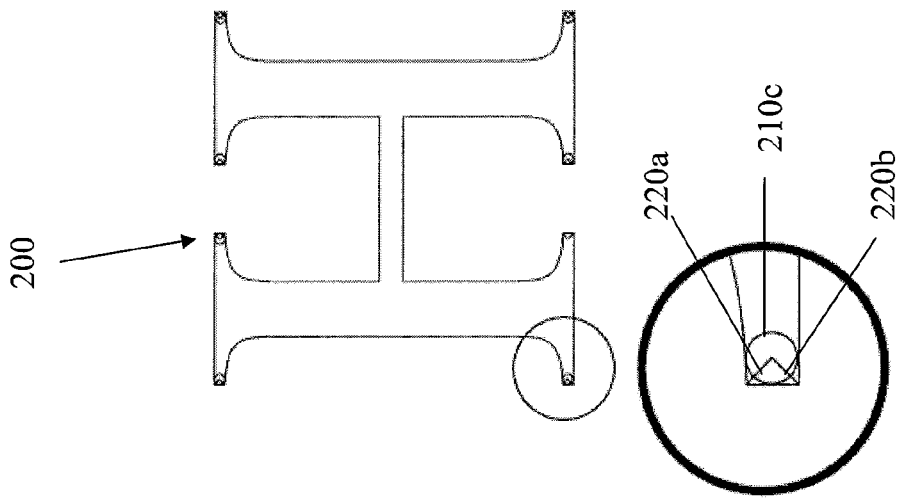
FIGS. 2A-2G illustrate steps in an exemplary method for building a skeleton for the exemplary character H of FIG. 1A.

FIGS. 1A and 1B depict an exemplary graphical object 100—a text character corresponding to the letter "H"—which has a corresponding outline 200. An exemplary method for generating a skeleton for object 100 is described below. It is a property of the skeleton that each point on the skeleton has at least two points corresponding to the outline as it nearest neighbor. As shown in FIGS. 2A through 2G, the process of building the skeleton may start at any place where the outline has an inflection point. In the exemplary embodiment, as shown in the magnified view of FIG. 2A, a grassfire algorithm is started at corners 202 (each of which are defined by an inflection points having an angle of 90 degrees). Each circle 210 generated by the algorithm tangentially contacts at least two points on outline 200. Dashed lines 215 (shown in FIG. 2D) correspond to the radius of circle 210 and extend from the nearest point on outline 200 to the center of circle 210. Line 220 corresponds to the line drawn as the center points of circles 210*i* of increasing radius are generated tangent to at least two nearest neighbors on the outline, starting from the initial end point of the skeleton. This process is repeated as shown in FIG. 2A throughout the outline of the exemplary graphical character for each inflection point meeting the criteria for generating the skeleton. Rather than examining each inflection point for an acceptable angle to start generating the skeleton, the skeleton algorithm may be initiated at each and every inflection point and terminated if the radius of the first generated circle exceeds a predetermined radius.

Figure 2B:
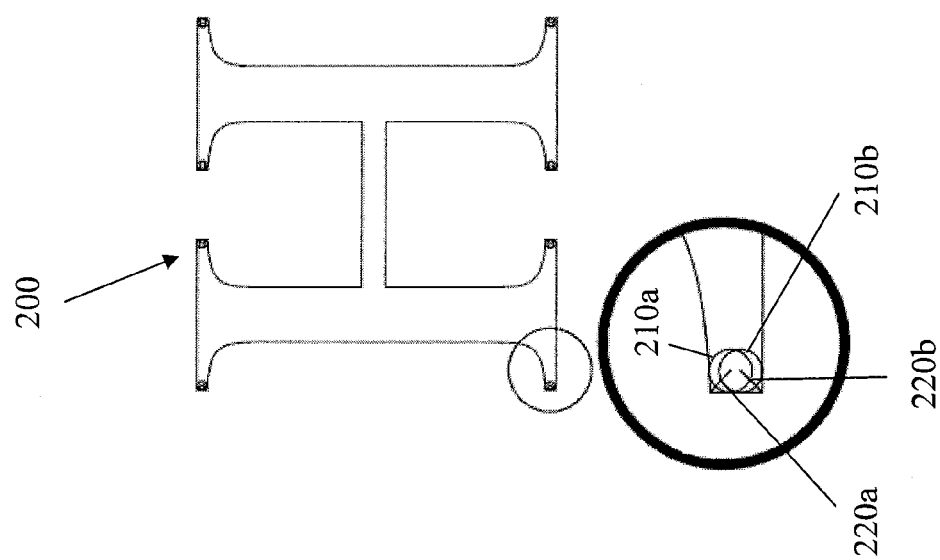
Figure 2A:
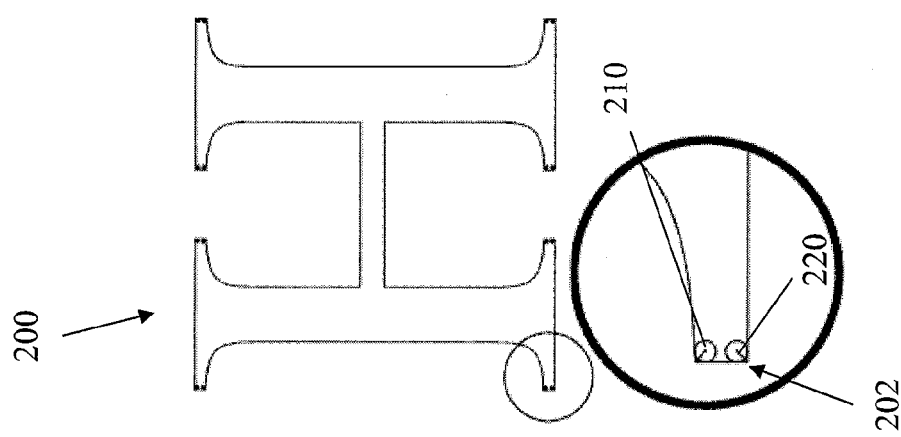
Figure 2G:
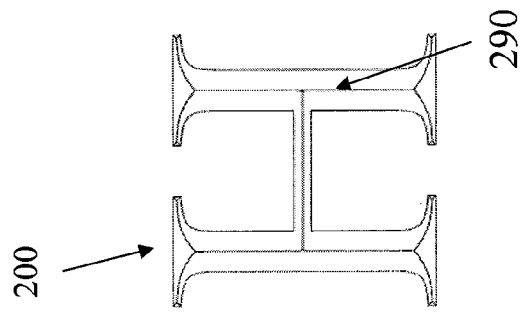
Figure 2F:
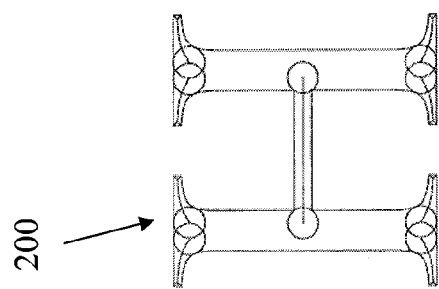
Figure 2E:
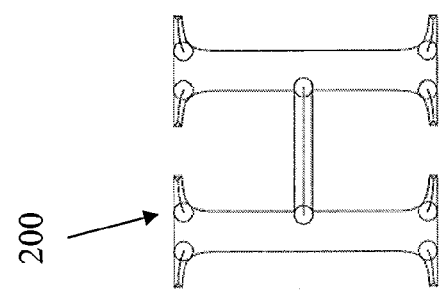
Figure 2D:
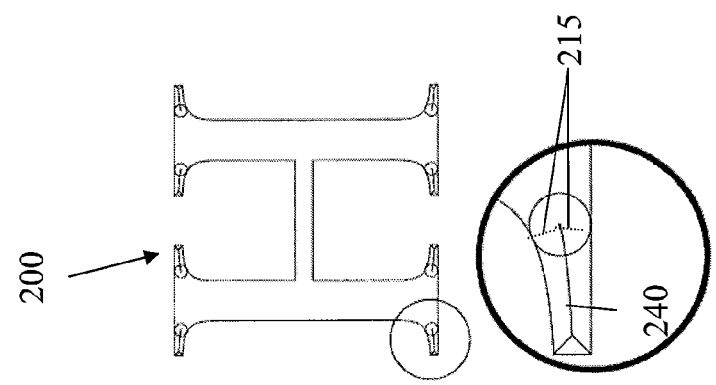

Thus, as shown in FIG. 2B, skeleton lines 220*a* and 220*b* continue to be generated by subsequent circles 210*a* and 210*b*. As shown in FIG. 2C, branch skeleton lines 220*a* and 220*b* may ultimately intersect and connect at a point corresponding to the center point of circle 210*c* to form central skeleton 240, shown in FIG. 2D. The above steps are repeated for each point on the outline of graphical character 200 until the algorithm creates a circle above some predetermined circle radius threshold, or it may continue until the full skeleton 290 is created as shown in FIG. 2G. It should be understood to one skilled in the art, that the process described above is an exemplary process for creating the skeleton or partial skeleton and that other algorithms may be used to create the skeleton as needed.

Once the skeleton, or relevant portion thereof, has been formed, the distance between each point on the skeleton 290 and its nearest neighbors on outline 200 is determined. This step may take place when generating the skeleton using the grassfire algorithm, for example, at the time each circle and its corresponding radius are defined. As would be well understood by one of skill in the art, radius 215 (shown in FIG. 2D), by definition, defines the distance from the skeleton to the outline. Once these distances are calculated, the distances are compared to a threshold value corresponding to the minimum thickness defined by the resolution limit. It will be well understood that the threshold value used for comparison to the radius of a circle generated using the grassfire algorithm will be a value that equals ½ the minimum thickness, or conversely, that the minimum thickness value is compared to a value corresponding to 2× the radius of the circle generated using the grassfire algorithm. As noted above, the minimum thickness may be determined by the resolution of output device or may be determined by any other criteria, including user-defined criteria.

As noted above, the determination of the thickness of the character may be accomplished at the same time as constructing skeleton 290 using a grassfire algorithm or any other such algorithm known to one of skill in the art. In an exemplary method using the grassfire algorithm in which thin portions are identified as the skeleton is created, only a partial skeleton may be generated to save time and processing. For example, whenever the radius of the circles generated by the algorithm reach a certain radius, the process of further generating the skeleton or skeleton branch from the corresponding inflection point or from an intersection of multiple branch skeletons may be terminated.

Figure 3C:
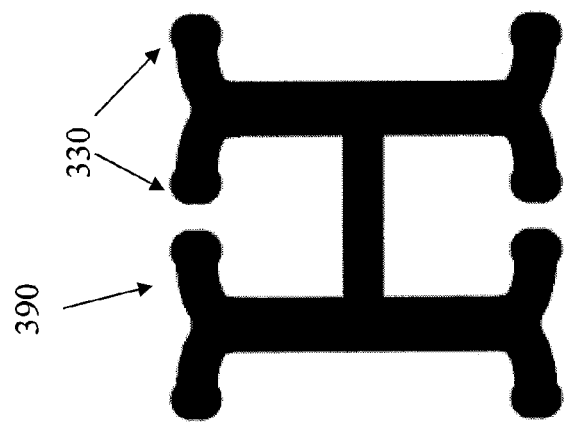
FIGS. 3A-3C illustrate steps of an exemplary method for defining a partial skeleton and adding stroked objects to the partial skeleton for the exemplary character H of FIG. 1A.
Figure 3B:
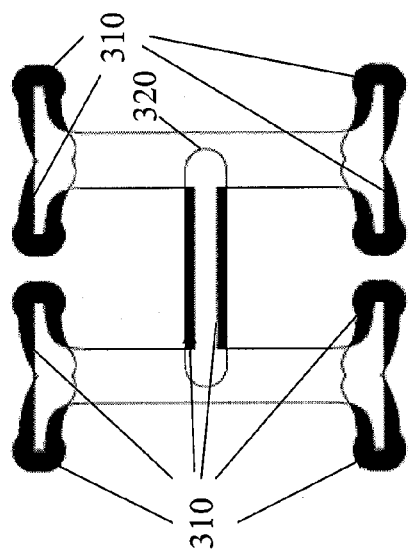

Once the thin parts are detected through the above described methods or any method known in the art, a second part of the exemplary method is initiated to fix selected thin portions by modifying those portions to have the threshold minimum thickness. One non-limiting method for modifying the character is through the use of a stroke. A stroke comprises a line or curve having a thickness corresponding to the predefined minimum thickness. This stroke is generated along the portion of the skeleton corresponding to the identified thin portions. Exemplary embodiments relating to stroke generation are shown in FIGS. 3B, 4B and 5B and discussed in greater detail in the three examples described below. As will be discussed in further detail below, the skeleton may be pruned using additional criteria before generating the stroke.

The method steps may be repeated for all graphical objects in the selected region. Upon creation of the a modified character portions as described above, an output file including the modified features is created. The method steps may further include sending the output file with the modified features to an output device for further processing, such as printing, displaying, making a printing, plate, or cutting.

Although the exemplary embodiments discussed below refer to a description of a graphical object that is filled, it should be understood that the modified graphical object may be only in outline form. The output file comprising the modified graphical objects may comprise one or more layers. In one exemplary embodiment, a first layer may comprise the graphical objects prior to thin portion identification and modification, and a second layer may comprise only the modifications to the thin portions. Such an embodiment may permit a user to see the modifications as compared to the original via a user interface and make additional manual adjustments, if desired. For example, various criteria are discussed below for determining the portions of the graphics features to be adjusted. A user may run one set of criteria, inspect the modifications as compared to the original using those criteria, and then decide to apply additional or different criteria. The criteria may be applied to the entire graphics file, or to sub-sections of the file as selected by the user. The user may even be able to select a single graphics feature for application of selected criteria. Saving the modifications in a separate layer permits easy identification of the modifications for later review.

In some exemplary embodiments of the present invention, the characteristics of the modified graphical object, for example the characteristics of text character in a particular font, may be stored for future use, such as part of a font file. For example, the method steps described herein may be performed on a particular font set so that every time the system encounters the identified characters in that font, the previously stored information may be accessed, thereby bypassing the need to repeatedly perform the method each time the same character is encountered. This storage of the modified graphical object corresponding to a certain input graphical object may be long term storage in which the system saves this information for future use in connection the same graphical features encountered in different projects relating to a particular output device, for example, or it may be short term storage in which the information is saved only for use within the same file or for use in connection with a single project corresponding to multiple files.

Finally, it is understood by one of skill in the art, that embodiments of the present invention relate not just to methods for carrying out the aforementioned steps, such as with a computer or other processor, but also to systems for executing the methods, including such printers or processors. For example, the method may be performed by a processor programmed with instructions corresponding to the method steps described herein. Embodiments of the invention also include computer readable media including program instructions, which when executed by a processor, cause the processor to perform the method steps, as well as processors so programmed. Additional embodiments comprise systems that include such programmed processors and output devices connected thereto for receiving the output files and creating an output corresponding to that file.

Example 1

In a first exemplary embodiment, as previously described, as the skeleton is created, the radii of the circles used to create the skeleton are compared to the threshold value for the minimum thickness of the character. In this manner, skeleton is built only when the radius is of the character is below the threshold value for the minimum thickness of the character. Once the radius of the circle surpasses the threshold value corresponding to the minimum thickness, the algorithm for generating the subject portion of the skeleton is terminated. Thus, the method creates a partial skeleton corresponding only to areas of the graphical object that are less than the threshold value corresponding to the minimum thickness. An exemplary partial skeleton 300 is shown in FIG. 3A.

Figure 3A:
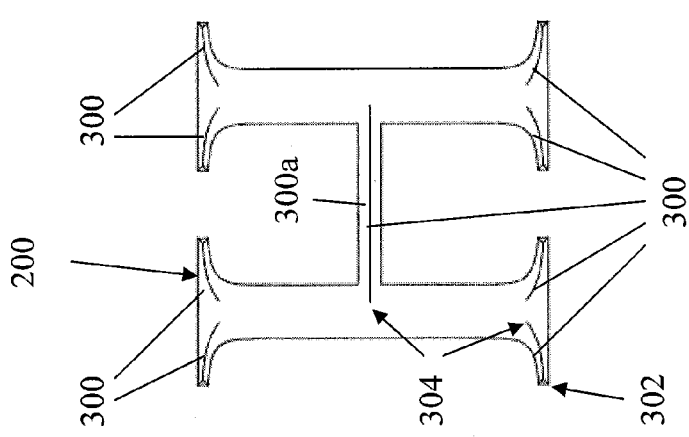

In FIG. 3A, partial skeleton 300 contains two types of skeleton end points: 302 and 304. Initiation end points 302 represent the start of the skeleton branch and are located adjacent the inflection points that initiated generation of the skeleton using the grassfire algorithm, such as at the corners of outline 200. Termination end points 304 represent the termination points of the partial skeleton 300 where the distance between the character outline 200 and the skeleton is equal to the given threshold value for the minimum thickness of the character and where generation of the skeleton past that point would have resulted in generating circles greater than the radius threshold. It should be noted, for example, that portion 300a of skeleton 300 corresponding to the bridge across the opposite pillars of the "H" character, comprises only termination end points, as the initiation points for the skeleton are not located at the ends of the line. Termination end points are typically open end points, whereas initiation end points 302 typically coincide with the inflection point and are therefore closed. Partial skeleton 300 shown in FIG. 3A comprises only identified thin parts.

As shown in FIG. 3B and as described above, the path generated by the partial skeleton 300 may be traced by a stroke that defines an area equal to the threshold value for the thickness of character. This stroke may have round caps 320 and/or round joins (not shown), meaning that end points of the stroke ("caps") and/or points where multiple strokes are joined ("joins") are rounded with a predetermined radius, which may be equal to half the thickness of the stroke or some different radius value. The darkened areas 310 shown FIG. 3B represent the modifications to outline 200 generated by exemplary strokes tracing all of the points of the partial skeleton shown in FIG. 3A. Combining these darkened areas 310 with the original object forms new character 390, as shown in FIG. 3C. Character 390 now contains no areas where the thickness of the character is below the threshold value for the minimum thickness of the character.

In one embodiment, the above steps may be repeated in connection with all graphical objects in the selected region. In another embodiment, the user may apply method steps relating to the above example to only certain portions of the graphics file, or may further edit the output file resulting from the above steps.

Example 2

Adding a stroke to all the points on partial skeleton 300 as defined in Example 1, however, may generate undesirable modifications in some portions of the characters. For example, adding the stroke along parts of the skeleton too close to the initiation end points of the skeleton, such as at un-sharp corners, may generate unwanted artifacts at these corners, such as bulbous portions 330.

Figure 4C:
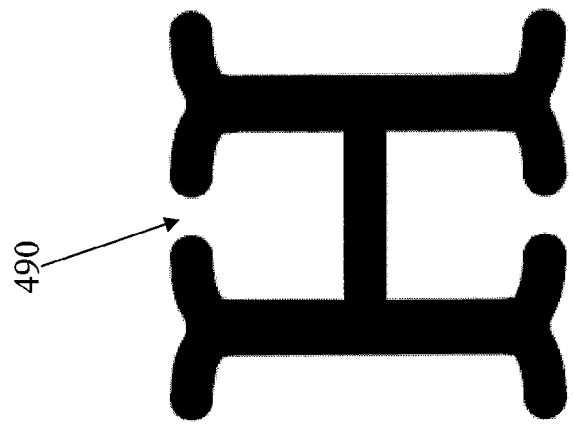
FIGS. 4A-4E illustrate criteria for defining a partial skeleton for the exemplary character H of FIG. 1A having fewer components than the skeleton defined in FIGS. 3A-3C, and the result of adding stroked objects to that partial skeleton.
Figure 4B:
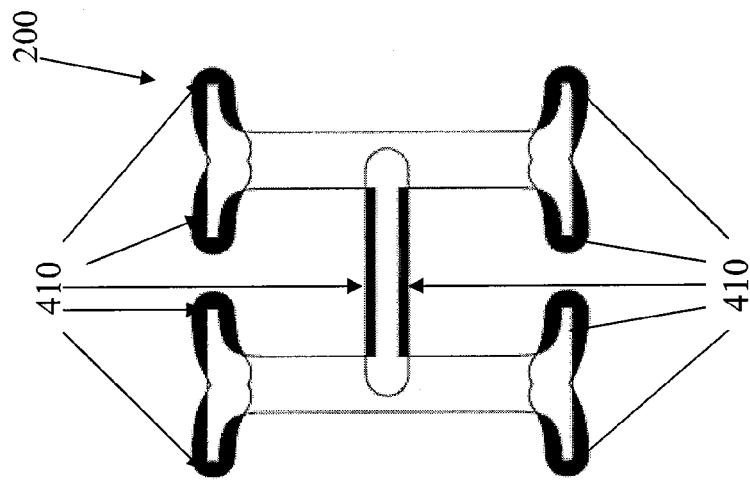
Figure 4A:
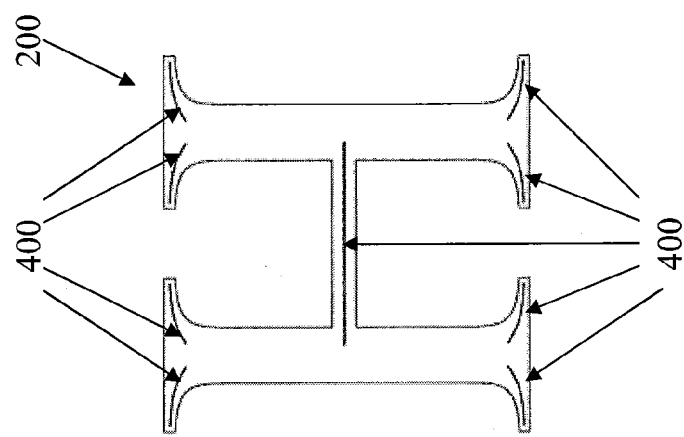

Accordingly, as shown in FIGS. 4A-4C, another exemplary embodiment of the invention may include additional criteria for identifying the thin portions to eliminate skeleton points that result in unwanted modifications to the graphical object when a stroke is applied. One set of exemplary criteria may be criteria that eliminates skeleton points within a defined threshold of the initiation end point.

Figure 4E:
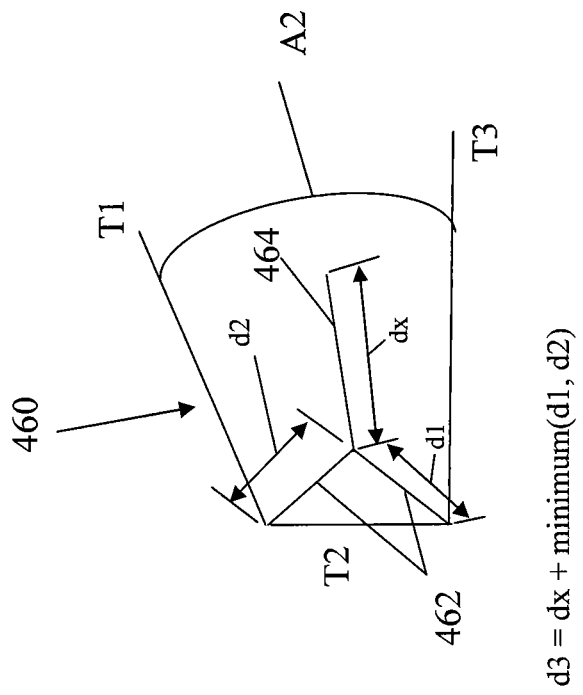
Figure 4D:
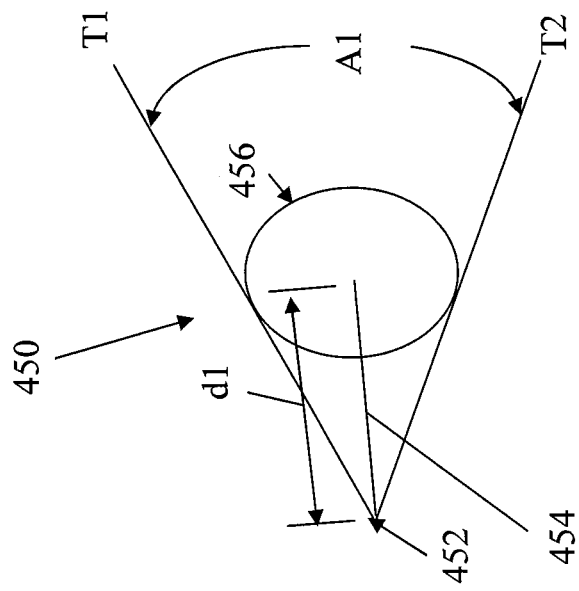

Another set of exemplary criteria may be criteria that eliminates skeleton points corresponding to a sharp or unsharp corner. For example, a sharp corner may be identified as one in which tangents to the nearest neighbor points lying on the circle generated by the skeleton algorithm intersect at an included angle below a certain threshold angle. For example, an angle that is under 90 degrees may be eliminated as corresponding to a sharp corner. The threshold angle is not limited to any particular angle and may be user-defined to provide a desired result. FIG. 4D shows an exemplary character portion, 450, initiation end point 452, portion of skeleton 454, threshold distance d1 from end point 452, and included angle A1 between of tangents T1 and T2 to circle 456 (which in this case are coextensive with the outline of the character portion 450). Threshold distance may correspond to the minimum thickness, or to some other threshold that is defined by the user or otherwise predetermined. This angle may be defined to correspond to a conventional "miter limit" known to one of skill in the art. As is known in the art, a "miter limit" is used to limit the angle formed by the intersection of two strokes, so as to prevent excessively pointed joints.

Yet another set of exemplary criteria may be criteria that identifies unsharp corners (corners having an angle greater than some threshold, such as for example 70 degrees) such as are present in the serifs of the H character depicted in the figures. For example, FIG. 4E illustrates unsharp corners in exemplary character portion 460. The corner between T1 and T2 is therefore defined as unsharp, as is the corner between T2 and T3. Accordingly, skeleton portions 462 between T1 and T2, and between T2 and T3 can be disqualified as relating to unsharp corners. But the part of the skeleton 464 between T1 and T3 may be treated as a sharp corner. Accordingly, a threshold distance may be applied to d3 (such as, for example, using the equation shown in FIG. 4E) to prune the portion of the skeleton where d3 is less than the threshold.

FIG. 4A illustrates a partial skeleton 400 corresponding to all portions of the skeleton where the thickness of the graphical object is below the threshold value for the minimum thickness and not including portions corresponding to points on the skeleton within a threshold distance to the Initiation end points or to an unsharp corner. Applying both of these criteria eliminates portions of the skeleton near the edges of the serifs of the H character, as is evident from a comparison of FIGS. 3A and 4A. It should be understood that although the points eliminated from skeleton 400 as compared to skeleton 300 include points that may be identified as either within the threshold distance to the initiation end points or within a threshold distance of an unsharp corner, the criteria for selecting points to remove from the skeleton may identify only points corresponding to sharp corners, only points corresponding to unsharp corners, only points too close to the initiation point, or some combination of less than all of these criteria.

As discussed above, the stroke is then applied only to partial skeleton 400. The darkened areas 410 shown in FIG.

4B represent the extended areas outside of the outline 200 that are added by the stroke. Once these darkened areas 410 are combined with the original object, a new character 490 is formed as shown in FIG. 4C.

The above steps may be repeated in connection with all graphical objects in the selected region, or may be applied only to selected portions of the selected region. For example, criteria corresponding to Example 1 may be applied throughout the entire region and shown on a user interface. The user may then, for example, highlight a sub-region in which to apply one or more of the additional criteria discussed in Example 2, such as for example to a specific graphical object or to a particular set of graphical objects (such as a text character set).

Example 3

Even applying strokes only to partial skeleton 400 may still generate unwanted modifications. This may be true especially for graphical text characters comprising serifs for which modifications are not desired. These serifs typically generate skeleton points with small distances to the original object boundary. For example, as shown in FIG. 4C, the applied stroke has a rounded end that eliminates the contour of the original serifs presents in the exemplary H character shown in FIG. 4A.

Figure 5C:
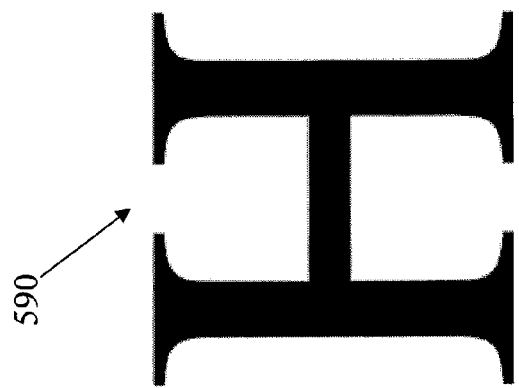
FIG. 5A-5C illustrate criteria for defining a partial skeleton for the exemplary character H of FIG. 1A having fewer components than the skeleton defined in FIGS. 4A-4C and adding stroked objects only on the partial skeleton so defined.
Figure 5B:
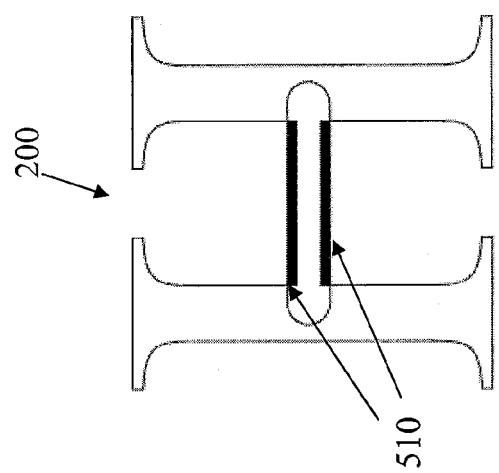
Figure 5A:
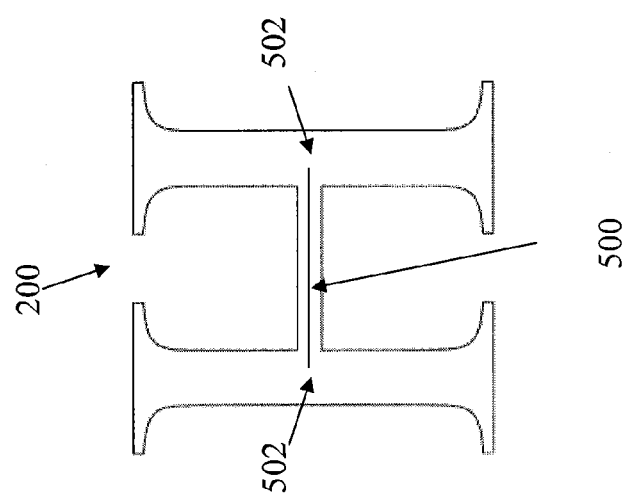

A third set of exemplary criteria may identify all parts of the skeleton that are not bounded by end points that lie within portions of the graphical object of a defined thickness. Typically, this set of method steps may eliminate portions of the skeleton that represent serifs of a text character. In this exemplary embodiment, partial skeleton 500 shown in FIG. 5A corresponds only to that portion of the H character bounded by two portions of the character that are above a predetermined threshold, which may correspond to the same threshold used to define the thin sections, or may be a different threshold. Partial skeleton 500 therefore corresponds to all portions of the outline less than the threshold thickness value and having endpoints lying within portions of the character that exceed the thickness value. In the current example, partial skeleton 500 lies between two open, termination endpoints. Thus, the criteria may also be stated to retain only portions of the skeleton that lie between open endpoints or that lie between two termination endpoints. Accordingly, partial skeleton 500 corresponds only to the bridge of the "H" as shown in FIG. 5A.

As discussed above, a stroke is then applied to define a modified character having the threshold thickness in the modified portion. The darkened areas 510 shown FIG. 5B represent the extended areas outside of the outline 200 added by the stroke. Once these darkened areas 510 are combined with the original object, a new character 590 is formed as shown in FIG. 5C. Character 590 comprises a thickened bridge of the "H," without modifying the serifs of the original "H" character 100.

Again, the criteria discussed in Example 3 may be applied to all graphical objects in the selected region or to only sub-regions as defined by the user or otherwise defined.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

Accordingly, while certain embodiments of this invention may be particularly useful for modifying thin portions of text characters, the invention is not limited to any particular types of graphics features. Similarly, although shown and illustrated herein in connection with a Latin text character—the letter "H"—the methods described herein may be particularly advantageous for use in connection with any type of Latin and non-Latin text characters, such as but not limited to Chinese, Japanese, or Arabic characters, as well as symbols, numbers, and various other non-alphanumeric characters.

What is claimed:

1. A method for proofing a graphical data input file for output to an output device, the method comprising automatically adjusting, using a computer programmed to perform such adjusting, at least one graphics feature in the input file to compensate for a predetermined resolution limit corresponding to the output device, the method comprising the steps of:
   (a) automatically identifying, using the computer, in at least a selected area of the input file, one or more portions of at least one graphics feature meeting a first set of predetermined criteria for adjustment, the first set of predetermined criteria including criteria for determining that the one or more portions has an initial thickness less than the predetermined resolution limit, the automatically identifying comprising:
      (i) converting, using the computer, the at least one graphics feature to an initial outline comprising a plurality of points, if the at least one feature is not already defined in an outline format;
      (ii) generating, using the computer, at least a partial skeleton corresponding to one or more portions of the at least one graphics feature in which a first radial value from the partial skeleton to one or more nearest points on the initial outline is less than half the predetermined resolution limit, wherein said one or more nearest points to said partial skeleton define said identified one or more portions;
   (b) automatically modifying with the computer only the identified one or more portions to have an adjusted thickness greater than the initial thickness, said modifying comprising pruning the partial skeleton with the computer to conform with a second set of predetermined criteria, said second set of predetermined criteria comprising rules for identifying areas to be thickened or not thickened in the graphical object, and defining a modified outline in which each nearest point to the pruned partial skeleton on the modified outline has a distance from the pruned partial skeleton corresponding to a second radial value; and
   (c) creating, using the computer, an output file comprising the at least one graphics feature having the identified one or more portions having the adjusted thickness.

2. The method of claim 1, wherein the at least one graphics feature comprises a text character.

3. The method of claim 2, wherein the at least one graphics feature comprises a non-Latin text character.

4. The method of claim 2, wherein the method further comprises storing in the computer, in association with the graphics feature, information identifying the adjustments made to compensate for the predetermined resolution limit for that graphics feature in a first instance, and using the stored information when encountering the same graphics feature in a second instance.

5. The method of claim 4, wherein the graphics feature comprises a character in a font set and storing the information identifying the adjustments comprises storing a modified font set.

6. The method of claim 4, wherein the information identifying the adjustments is stored in short term computer memory storage and the first and second instances are encountered when processing a single input file or multiple input files associated with a single project.

7. The method of claim 4, wherein the information identifying adjustments is stored in long term computer memory storage and the first and second instances relate to first and second input files processed for use in connection with the output device.

8. The method of claim 1, wherein the second set of predetermined criteria for pruning the partial skeleton includes criteria selected from the group consisting of: criteria for pruning the skeleton except where it is determined that the identified one or more portions has a location lying between two portions of the graphic feature each having a thickness greater than a resolution limit; criteria for pruning the skeleton where it is determined that the identified one or more portions has a location corresponding to a skeleton point within a predetermined distance of one or more of: a skeleton initiation end point, a sharp corner, or an unsharp corner; and a combination thereof.

9. The method of claim 1, wherein the output file comprises a plurality of layers and the modified outline is stored on a different layer than the initial outline.

10. The method of claim 1, further comprising receiving in the computer a user input identifying the selected area.

11. The method of claim 1, wherein said modifying in step (b) comprises using a stroke algorithm to define a stroke having a thickness corresponding to the predetermined resolution limit centered along the pruned skeleton to define the modified outline.

12. The method of claim 11, wherein said modifying in step (b) further comprises rounding caps and joins associated with the stroke.

13. The method of claim 1, further comprising the computer sending the output file to the output device and using the output device to display the at least one graphics feature, print the at least one graphics feature, make a printing plate comprising the at least one graphics feature, or cut from a material the at least one graphics feature.

14. The method of claim 1, wherein the predetermined resolution limit is defined by the output device having a lower resolution limit than a resolution limit of the input file.

15. The method of claim 1, wherein the predetermined resolution limit is a user-imposed limit.

16. The method of claim 1, comprising automatically identifying and modifying with the computer all portions of all graphics features meeting the predetermined criteria in the selected area.

17. A system for proofing a graphical data input file for output to an output device, the system configured for automatically adjusting at least one graphics feature to compensate for a predetermined resolution limit, the system comprising a controller comprising a processor having a memory programmed with instructions for performing the method steps of
(a) automatically identifying, in at least a selected area of the input file, one or more portions of at least one graphics feature meeting a first set of predetermined criteria for adjustment, the first set of predetermined criteria including criteria for determining that the one or more portions has an initial thickness less than the predetermined resolution limit, said automatically identifying comprising:
(i) converting the at least one graphics feature to an initial outline comprising a plurality of points, if the at least one feature is not already defined in an outline format, and
(ii) generating at least a partial skeleton corresponding to one or more portions of the at least one graphics feature in which a first radial value from the partial skeleton to one or more nearest points on the initial outline is less than half the predetermined resolution limit, wherein said one or more nearest points to said partial skeleton define said identified one or more portions;
(b) automatically modifying only the identified one or more portions to have an adjusted thickness greater than the initial thickness, said modifying comprising pruning the partial skeleton to conform with a second set of predetermined criteria, said second set of predetermined criteria comprising rules for identifying areas to be thickened or not thickened in the graphical object, and defining a modified outline in which each nearest point to the pruned partial skeleton on the modified outline has a distance from the pruned partial skeleton corresponding to a second radial value; and
(c) creating an output file comprising the at least one graphics feature having the identified one or more portions having the adjusted thickness.

18. The system of claim 17, further comprising the output device.

19. The system of claim 1, wherein the output device comprises a printer, a printing plate maker, or a cutter connected to the controller.

20. The system of claim 17, wherein the second set of predetermined criteria for pruning the partial skeleton includes criteria selected from the group consisting of: criteria for determining that the identified one or more portions has a location lying between two portions of the graphic feature each having a thickness greater than a resolution limit; criteria for determining that the identified one or more portions has a location not corresponding to a skeleton point within a predetermined distance of one or more of: a skeleton initiation end point, a sharp corner, or an unsharp corner; and a combination thereof.

21. A non-transitory computer readable media including program instructions for proofing a graphical data input file for output to an output device, the instructions programmed for automatically adjusting at least one graphics feature in the input file to compensate for a predetermined resolution limit corresponding to the output device, said program instructions when executed by a processor for causing the processor to perform the steps of:
(a) automatically identifying, in at least a selected area of the input file, one or more portions of at least one graphics feature meeting a first set of predetermined criteria for adjustment, the first set of predetermined criteria including criteria for determining that the one or more portions has an initial thickness less than the predetermined resolution limit, said automatically identifying comprising:
(i) converting the at least one graphics feature to an initial outline comprising a plurality of points, if the at least one feature is not already defined in an outline format, and
(ii) generating at least a partial skeleton corresponding to one or more portions of the at least one graphics feature in which a first radial value from the partial skeleton to one or more nearest points on the initial outline is less than half the predetermined resolution limit, wherein said one or more nearest points to said partial skeleton define said identified one or more portions;

(b) automatically modifying only the identified one or more portions to have an adjusted thickness greater than the initial thickness, said modifying comprising pruning the partial skeleton to conform with a second set of predetermined criteria, said second set of predetermined criteria comprising rules for identifying areas to be thickened or not thickened in the graphical object, and defining a modified outline in which each nearest point to the pruned partial skeleton on the modified outline has a distance from the pruned partial skeleton corresponding to a second radial value; and (c) creating an output file comprising the at least one graphics feature having the identified one or more portions having the adjusted thickness.

22. The system of claim 21, wherein the second set of predetermined criteria for pruning the partial skeleton includes criteria selected from the group consisting of: criteria for determining that the identified one or more portions has a location lying between two portions of the graphic feature each having a thickness greater than a resolution limit; criteria for determining that the identified one or more portions has a location not corresponding to a skeleton point within a predetermined distance of one or more of: a skeleton initiation end point, a sharp corner, or an unsharp corner; and a combination thereof.

* * * * *

UNITED STATES PATENT AND TRADEMARK OFFICE
CERTIFICATE OF CORRECTION

| | | |
|---|---|---|
| PATENT NO. | : 8,648,862 B2 | Page 1 of 1 |
| APPLICATION NO. | : 12/840899 | |
| DATED | : February 11, 2014 | |
| INVENTOR(S) | : Luc Henri Maria Leon Schildermans, Wim Jan C. Fransen and Frank Adegeest | |

It is certified that error appears in the above-identified patent and that said Letters Patent is hereby corrected as shown below:

In the Claims

In column 12, line 29, in claim 19, "The system of claim 1"
should read – The system of claim 18 –

Signed and Sealed this
Twenty-seventh Day of May, 2014

Michelle K. Lee
*Deputy Director of the United States Patent and Trademark Office*